(12) United States Patent
Platzer et al.

(10) Patent No.: US 10,364,870 B2
(45) Date of Patent: Jul. 30, 2019

(54) SWITCHING DEVICE AND ADJUSTING ARRANGEMENT FOR CONTROL DEVICES

(71) Applicant: AUMA Riester GmbH & Co. KG, Mullheim (DE)

(72) Inventors: Wilfried Platzer, Freiburg (DE); Benjamin Hofmann, Heitersheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 312 days.

(21) Appl. No.: 15/303,372

(22) PCT Filed: Apr. 16, 2015

(86) PCT No.: PCT/EP2015/000796
§ 371 (c)(1),
(2) Date: Oct. 11, 2016

(87) PCT Pub. No.: WO2015/158433
PCT Pub. Date: Oct. 22, 2015

(65) Prior Publication Data
US 2017/0030443 A1    Feb. 2, 2017

(30) Foreign Application Priority Data

Apr. 16, 2014    (DE) .................. 10 2014 005 628

(51) Int. Cl.
| | |
|---|---|
| *F16K 31/05* | (2006.01) |
| *F16H 21/44* | (2006.01) |
| *F16K 31/53* | (2006.01) |
| *F16K 31/04* | (2006.01) |

(52) U.S. Cl.
CPC .......... *F16H 21/44* (2013.01); *F16K 31/043* (2013.01); *F16K 31/055* (2013.01); *F16K 31/535* (2013.01)

(58) Field of Classification Search
CPC ...... F16H 21/44; F16K 31/043; F16K 31/055; F16K 31/535
See application file for complete search history.

(56) References Cited

U.S. PATENT DOCUMENTS

| | | |
|---|---|---|
| 1,245,574 A | 11/1917 | Dean |
| 1,670,313 A | 5/1928 | Oswald |
| 4,099,551 A | 7/1978 | Billington et al. |
| 4,550,860 A * | 11/1985 | Weeder .................. A01C 19/00 111/69 |
| 5,078,066 A * | 1/1992 | Lafferty .................. A01C 7/00 111/170 |

FOREIGN PATENT DOCUMENTS

| | | |
|---|---|---|
| EP | 0118230 | 2/1984 |
| EP | 1536163 | 6/2005 |
| SU | 476402 | 7/1975 |
| WO | 0150049 | 7/2001 |

* cited by examiner

Primary Examiner — Vicky A Johnson
(74) Attorney, Agent, or Firm — Volpe and Koenig, P.C.

(57) ABSTRACT

A switching device (8) for control devices is provided, in which a recess (14) in an element (13) driven by an emergency drive (11) is designed with at least one inclined surface (17, 18) such that a blocking element (15) engaging in the recess (14) can be disengaged from the latter when the emergency drive (11) is actuated.

14 Claims, 7 Drawing Sheets

SWITCHING DEVICE AND ADJUSTING ARRANGEMENT FOR CONTROL DEVICES

BACKGROUND

The invention relates to a fitting switching device, having a drive-output shaft and having an input shaft which is coupled to the drive-output shaft and by way of which the drive-output shaft can be driven in the normal operating mode, and having an emergency drive, wherein the drive-output shaft can be transferred from a usage position into an end position additionally by the emergency drive, wherein a recess is formed on an element which is drivable and/or driven by the emergency drive, and wherein a blocking element is movable by way of an actuating device from a position in which said locking element is disengaged from the recess into a position in which said locking element engages into the recess.

The invention also relates to a fitting control arrangement having a control drive, wherein a drive output of the control drive is operatively connected to the input shaft of a fitting switching device.

Fitting control arrangements are known and are used for the actuation of fittings, for example in industrial installations. Such fitting switching devices are for example known from technical systems in which a mass flow is subjected to open-loop or closed-loop control by way of fittings. Here, in the normal operating mode, the fittings are actuated by way of corresponding control drives. In the event of a power failure, for example in the case of an electrical power failure or in the event of a failure of a hydraulic or pneumatic supply of the control drives, the fitting switching devices serve for transferring the drive-output shaft into a predefined end position in order to transfer the respectively connected fitting into a defined end state, for example an open state or a closed state. For this purpose, the fitting switching device switches from the normal operating mode into the predefined end position in order to transfer the respectively connected fitting into a defined end state, for example an open state or a closed state. For this purpose, the fitting switching device switches from the normal operating mode into the predefined end position in the event of deviations. Since the defined end state of the respectively connected fitting is, in a common usage scenario, a closed state, the fitting switching device is also referred to as a fitting closing device.

For this purpose, it has become common for the fitting switching device to be equipped with an emergency drive which, outside the normal operating mode, ensures the transfer of the drive-output shaft into the desired end position. To prevent the emergency drive from intervening in a power flow between the input shaft and the drive-output shaft in the normal operating mode, locking devices are used which lock the emergency drive in the normal operating mode. For this purpose, an element which is drivable and/or driven by the emergency drive may have a recess into which a blocking element engages with a locking action.

EP 1 536 163 A2 has disclosed an actuator for a cable-controlled automatic gearbox, in the case of which a coil acts on a claw, wherein, in the coil, there is formed an internal return spring for disengaging the claw in the deenergized state.

U.S. Pat. No. 1,670,313A has disclosed a system of a liquid pressure control arrangement, in the case of which a claw which has two teeth is provided which can be engaged, by way of an electromagnet, into a toothing of a gearwheel, wherein a return spring is provided for the disengagement of the claw.

SUMMARY

The invention is based on the object of providing a fitting switching device which operates in a simple and reliable manner.

This object is achieved according to the invention. Thus, according to the invention, to achieve the stated object in the case of a fitting switching device of the type described in the introduction, it is provided that the recess has at least one oblique surface which acts on the blocking element, and that the at least one oblique surface is oriented such that a force that can be imparted to the blocking element by the emergency drive in the engaging position has a component which causes the blocking element to be disengaged from the recess. Here, it is advantageous that the emergency drive can automatically eliminate the locking action as soon as the actuating device releases the blocking element. It is thus possible to avoid malfunctions of the fitting switching device wherein, as a result of the locking of the emergency drive erroneously not being eliminated outside the normal operating mode, said emergency drive cannot transfer the drive-output shaft into the desired end position. The fitting switching device can be easily designed to be reliable, whereby the stated object is achieved.

Here, the oblique surface may be of planar or arcuate form. For example, the oblique surface may describe in each case one straight line, or any desired, for example arcuate, curve, in one direction or in two directions. For example, the oblique surface may be formed as part of a conical recess. In this case, the oblique surface describes a straight line in one direction, specifically along a surface line of a cone of the conical recess, and describes an arcuate curve, generally a circle, in a direction perpendicular thereto. The direction of the component of the force that can be introduced is defined by an (infinitesimal) orientation of the oblique surface at a point at which the blocking element makes contact with the oblique surface. This point may travel on the oblique surface during the disengagement, such that, at least in the case of non-planar oblique surfaces, that is to say oblique surfaces which are arcuate in at least one direction, the direction of the action may change.

It is particularly expedient if the oblique surface describes an opening which widens toward the open end. Thus, a simple means is provided by which the locking element can be removed from the recess by way of a movement of the driven and/or drivable element.

It is particularly expedient if two oblique surfaces jointly define the opening, which oblique surfaces effect the above-mentioned disengagement according to the invention for opposite directions of a movement of the element.

In one refinement of the invention, it may be provided that the drivable and/or driven element is a rotating element. Here, it is advantageous for the emergency drive to be lockable directly on an element in the power flow between the emergency drive and the drive-output shaft.

In one refinement of the invention, it may be provided that the component is oriented radially in relation to an axis of rotation of the drivable and/or driven element. The invention can thus be used in the case of a fitting switching device in which the blocking element engages with a radially oriented movement into the recess for locking purposes.

It may for example be provided that the oblique surface is oriented obliquely relative to an axis of rotation of the drivable or driven element and/or is oriented at an angle with respect to a radial direction.

It may alternatively be provided that the component is oriented axially in relation to an axis of rotation of the drivable and/or driven element. Thus, the invention can be used in the case of a fitting switching device in the case of which the blocking element engages with an axially oriented movement into the recess for locking purposes. Here, it is advantageous that the actuating device can be arranged closer to the axis of rotation. Thus, a center of gravity of the fitting switching device can be formed closer to the axis of rotation. In this way, assembly and/or handling characteristics of the fitting switching device can be improved. It is particularly expedient if the actuating device is arranged in a common axial region with an electronic circuit for actuation purposes, for example between the emergency drive and a superposition gearing, for example the superposition gearing to be described further below.

It may for example be provided that the oblique surface is oriented obliquely and/or at an angle with respect to an axis of rotation, for example the abovementioned axis of rotation, of the drivable or driven element or with respect to an axial direction running parallel to the axis of rotation.

In a refinement of the invention which is possibly of independently inventive quality, it may be provided that the blocking element is formed on an outer ring of a ball bearing. Alternatively, it may be provided that the blocking element is formed by an outer ring of a ball bearing. It is advantageous here that it can be achieved in a simple manner that the blocking element can roll on the drivable or driven element. It can thus be achieved that the blocking element poses the least possible resistance to a force introduced via the oblique surface by the emergency drive. It can thus be achieved that the blocking element is forced out of the recess with particularly free movement. The blocking element is preferably arranged or mounted on a journal.

In the case of the invention, the actuating device is switchable between an activated state, in which the blocking element is advanced into the engaging position, and a releasing state, in which the blocking element is released in terms of its mobility. For example, it may be provided that the activated state is an energized state, and the releasing state is a deenergized state, of the actuating device. Here, it is advantageous that, in the event of an electrical failure, the actuating device is automatically transferred into the releasing state.

In a refinement of the invention, it may be provided that the blocking element is formed on a free end of a knee lever. Here, it is advantageous that, during the movement of the blocking element into the engaging position, a high force transmission ratio can be realized shortly before said engaging position is reached. Reliable locking, for example when the actuating device is activated, can thus be achieved. A knee lever may generally be characterized as an arrangement in which two limbs are articulatedly connected to one another, wherein one of the two limbs is articulated at an end averted from the connecting joint, and the other of the two limbs forms a free end at an end averted from the connecting joint.

In one refinement of the invention, it may be provided that the actuating device engages on a movable joint of a knee lever, for example of the knee lever already mentioned above. It is advantageous that expedient force transmission ratios can be realized. It is particularly expedient if, here, the blocking element is arranged on a free end of the knee lever, for example is mounted on a journal.

In one refinement of the invention, it may be provided that a stop element is formed which prevents the knee lever from being transferred into a fully straightened position. Here, it is advantageous that over-straightening of the knee lever can be reliably prevented. An over-straightened orientation of the knee lever would be disadvantageous, because then there would be the risk of the knee lever assuming a blocked state and preventing, or at least impeding, an automatic disengagement of the blocking element when the actuating device is released. Here, the stop element may be formed on the knee lever itself or on a static housing part or in some other manner.

In general, it can be stated that it is expedient if the engaging position of the blocking element corresponds to a less flexed position of the knee lever than the disengaged position. In this case, the actuating device can for example transfer the blocking element into the engaging position by virtue of the knee lever being straightened, wherein a fully straightened orientation of the knee lever can be prevented by way of a stop element as already mentioned above.

In one refinement of the invention, it may be provided that the knee lever is articulated on an engagement point which is adjustable in terms of situation. Here, it is advantageous that the situation of the blocking element in the engaging position can be easily adjusted by virtue of a situation of the engagement point being adjusted. This may be realized for example by way of control screws or in some other manner. In this way, it is possible for manufacturing tolerances in the knee lever, and in the driveable or driven element with its recess, to be easily compensated.

In one refinement of the invention, it may be provided that a free end, for example the free end already mentioned above, of the knee lever is guided in a housing part. Here, it is advantageous that a movement of the blocking element between the engaging position and the disengaged position can be performed in a defined manner. Corresponding guide elements or guide means may be formed for this purpose. For example, a journal, in particular the described journal which bears the blocking element, may be formed as a guide element. Alternatively or in addition, a slot or a groove into which a journal can engage may be formed as a guide means.

In one refinement of the invention, it may be provided that the actuating device has a solenoid. It is advantageous here that an electrical actuation of the actuating device can be easily realized. It is also advantageous that a changeover to a releasing state in the event of an electrical failure can be easily realized. This is because, in the event of a failure of the energization, a solenoid automatically loses its holding force. If said holding force is utilized for actuating the blocking element, this results in an automatic changeover into the releasing state in the event of an electrical failure.

In one refinement of the invention, it may be provided that an electronic circuit for the actuation of the solenoid is formed, which electronic circuit is designed for providing a first coil current for an attracting action of the solenoid and for providing a relatively lower second coil current for a holding action of the solenoid. It is thus possible for energy to be saved during operation.

In one refinement of the invention, it may be provided that the actuating device has a spring which assists an actuating movement of the actuating device. Here, it is advantageous that an additional force can be provided for the actuating movement. The use of a spring is particularly expedient if the actuating device has a solenoid. This is because a solenoid generates only a low force at the start of its travel range. An assisting spring now has the effect that the blocking element can be acted on with an adequate force from the very start of the adjustment movement. Here, it is particularly expedient if the spring can be stressed by way of a transfer of the blocking element from the engaging position into the disengaged position.

In one refinement of the invention, it may be provided that the spring is relaxed when the blocking element has been transferred into the engaging position. Here, it is advantageous that the spring poses the least possible resistance to the automatic disengagement of the blocking element when the actuating device is in the releasing state.

In general, it is expedient if a spring force of the spring is dimensioned such that, when the actuating device is inactive, the blocking element can be disengaged from the recess counter to the spring force by way of the emergency drive. Here, it is advantageous that an automatic disengagement counter to the spring can be effected by way of the emergency drive.

In one refinement of the invention, it may be provided that the actuating device has a plunger element which acts directly or indirectly on the blocking element and which is fastened, adjustably in terms of situation, to a movable drive part of the actuating device. Here, it is advantageous that a situation of the blocking element in the engaging position is adjustable by virtue of a situation of the plunger element on the drive part being adjusted. For example, the drive part may be an armature of a solenoid. It is particularly expedient if the plunger element has a thread by way of which said plunger element is screwed into the drive part. Particularly simple situation adjustment can be realized in this way.

In one refinement of the invention, it may be provided that a detection element is provided, by way of which an attainment and/or presence of the engaging position can be detected. Here, it is advantageously the case that locking of the emergency drive can be monitored. It is particularly expedient for the detection element to be a limit switch. In this way, the attainment of the engaging position can be detected particularly easily.

In one refinement of the invention, it may be provided that a combination device is provided which is designed for logically combining an output signal of the detection element with a monitoring signal of the actuating device. Said monitoring signal may for example be derived from an energization of the actuating device. Here, it is advantageously possible for monitoring to be performed as regards whether, with the actuating device in a releasing state, the blocking element is disengaged, and/or, with the actuating device activated, the emergency drive is locked.

In one refinement of the invention, it may be provided that a superposition gearing is arranged in the power flow between the input shaft and the drive-output shaft, wherein a second input of the superposition gearing is coupled to the drivable and/or driven element. Here, it is advantageous that an addition of the rotational speeds and/or torques of the emergency drive and of the input shaft can be realized in a simple manner. In this way, it is possible to dispense with switching by way of couplings in the event of a changeover from the normal operating mode to an operating mode with emergency drive. A superposition gearing may for example be characterized as a gearing with two inputs and one drive-output shaft, wherein torques introduced via each of the inputs—and if appropriate converted by way of a transmission—are provided, added together, at the drive output shaft. For example, the superposition gearing may be a differential gearing or an epicyclic gearing, in particular a four-wheel planetary gear set.

The invention can advantageously be used in the case of a fitting control arrangement of the type described in the introduction, wherein the fitting switching device is designed according to the invention, in particular as described above and/or according to one of the patent claims directed to a fitting switching device. Here, the fitting switching device may be integrated with the control drive or may be designed to be detachably connectable thereto.

BRIEF DESCRIPTION OF THE DRAWINGS

The invention will now be described in more detail on the basis of an exemplary embodiment, but is not restricted to this exemplary embodiment. Further exemplary embodiments emerge from a combination of the features of individual or multiple patent claims with one another and/or with individual or multiple features of the exemplary embodiment.

In the figures.

DETAILED DESCRIPTION OF THE PREFERRED EMBODIMENTS

Figure 1:
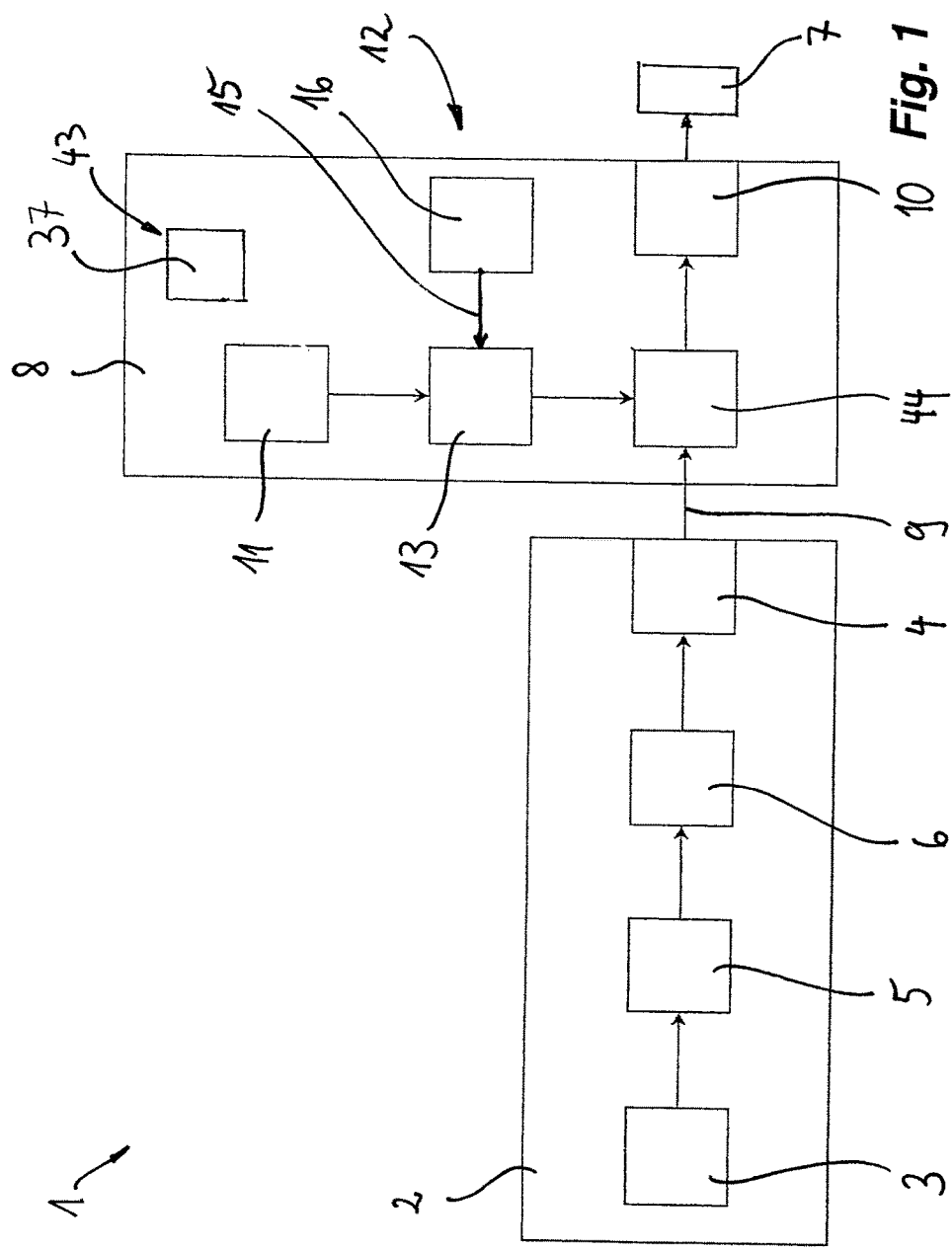
FIG. 1 shows a fitting control arrangement according to the invention in a greatly simplified block diagram.

FIG. 1 shows, in a greatly simplified illustration in the form of a block diagram, a fitting control arrangement denoted as a whole by 1.

The fitting control arrangement 1 has, in a manner known per se, a control drive 2. The control drive 2 has a motor 3, which is operable electrically, hydraulically, pneumatically or in some other way, and has a drive output 4, which can be driven by the motor 3. A brake 5 and/or a gearing 6 may be interconnected, in a manner known per se from control drives, between the motor 3 and the drive output 4.

The control drive 3 serves for the actuation of a fitting 7. This fitting 7 may for example be a valve.

A fitting switching device 8 according to the invention is arranged between the control drive 2 and the fitting 7.

The fitting switching device 8 serves for the actuation or switching, for example closing or opening, of the fitting 7 in the event of an operational fault or a power failure.

For this purpose, the fitting switching device 8 is equipped with an input shaft 9 and with a drive-output shaft 10, which are coupled to one another in order that a power flow can be transmitted from the input shaft 9 to the drive-output shaft 10.

The input shaft 9 is, in order to form the fitting control arrangement 1, connected to the drive output 4 of the control drive 2. The drive-output shaft 10 is operatively connected, for operation, to the fitting 7.

The fitting switching device 8 has an emergency drive 11 by which the drive-output shaft 10 can, in the event of a failure of the control drive 2, be actuated or driven in order to transfer the drive-output shaft 10 from the usage position into a defined end position, for example a closed or open fitting 7.

For this purpose, there is arranged between the input shaft 9 and the drive-output shaft 10 a superposition gearing 44 by way of which the emergency drive 11 is coupled to the drive-output shaft 10.

Here, the emergency drive 11 may be driven electrically, pneumatically, hydraulically or mechanically or in some other way by an energy store which is not illustrated in any more detail but which is known per se.

To prevent the emergency drive 11 from inadvertently intervening in the normal operating mode by way of the control drive 2, a locking device 12 is connected downstream of the emergency drive 11.

This locking device 12 is shown in more detail in FIGS. 2 to 4 and will be described in more detail with reference to said figures.

The locking device 12 has an element 13 which is arranged in the power flow between the emergency drive 11 and the drive-output shaft 10. The element 13 can thus be driven by the emergency drive 11, and is driven by the emergency drive 11 in the event of a fault.

Figure 4:
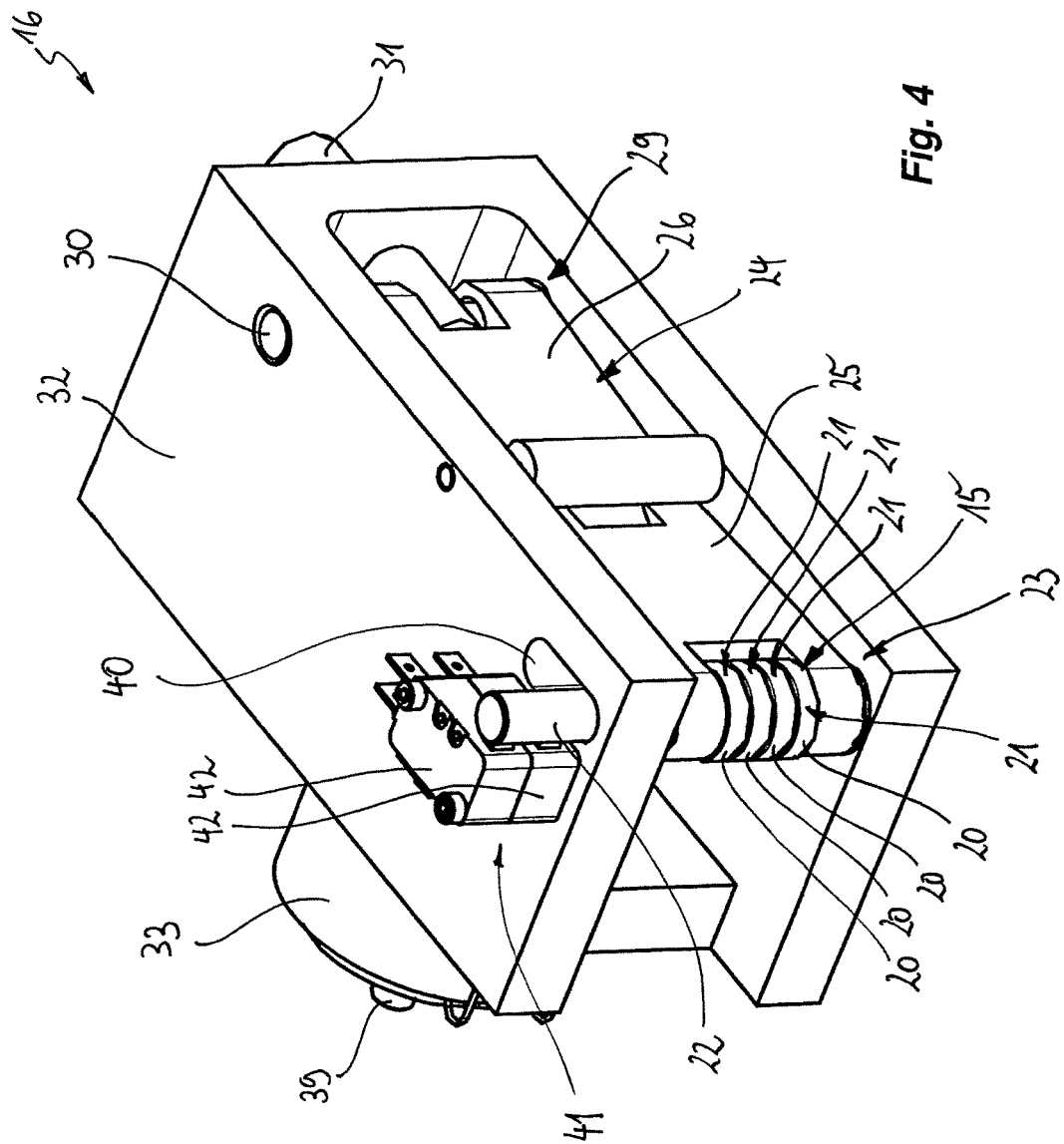
FIG. 4 shows the locking device according to the invention from FIG. 2 in a three-dimensional perspective view.

In order to simplify the illustration, the element 13 has been omitted in FIG. 4.

Here, the element 13 may be in the form of a rotating element. FIGS. 2 and 3 show the element 13 as part of a shaft, in this case a hollow shaft. In further exemplary embodiments, however, other rotating elements, or else for example linearly movable or pivotable elements, may be provided as element 13.

A recess 14 is formed on the outside of the element 13.

Figure 2:
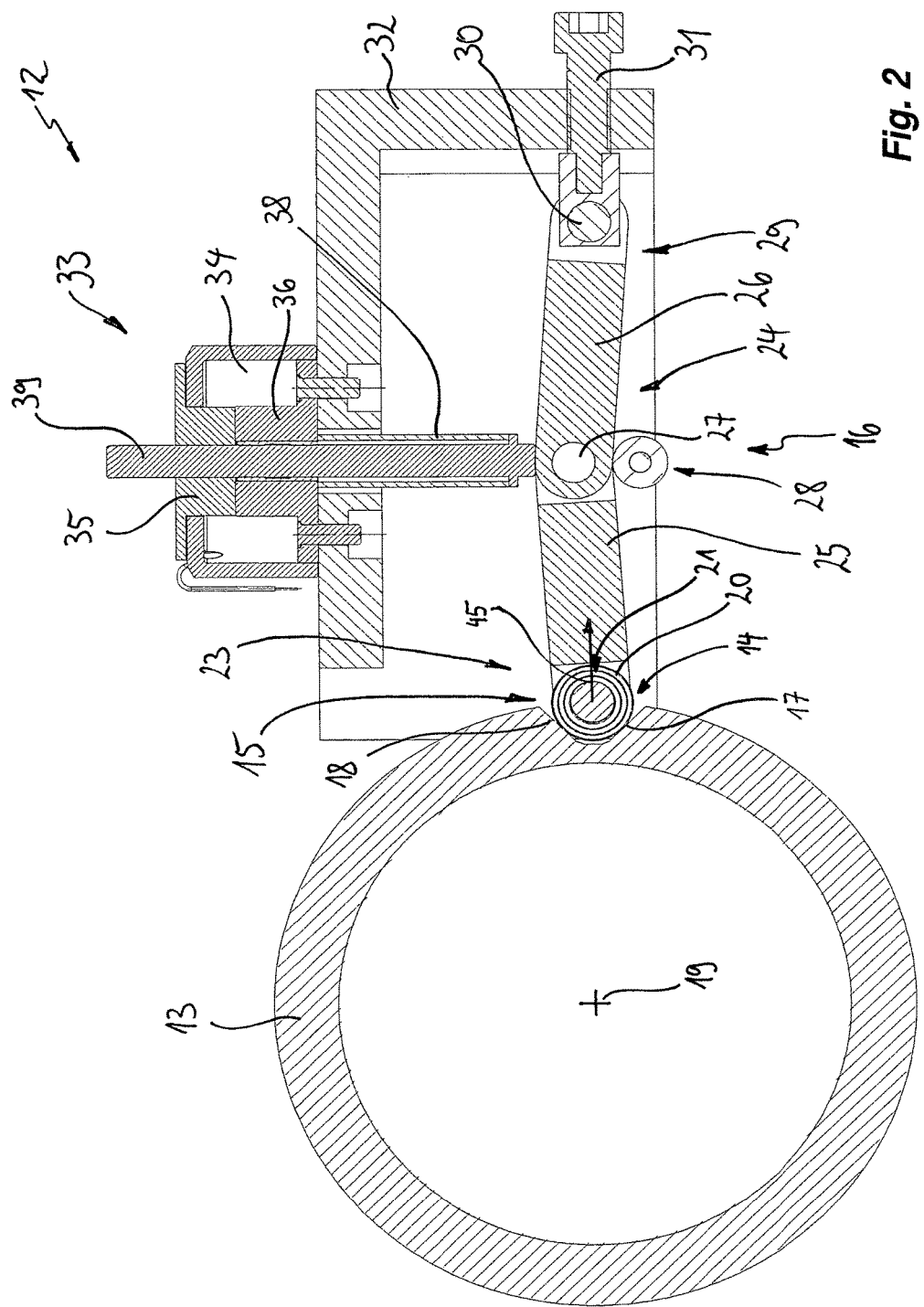
FIG. 2 shows a locking device of a fitting switching device according to the invention, with a blocking element situated in an engaging position, in a sectional illustration.

For locking purposes, a blocking element 15 engages into the recess 14, as shown in FIG. 2.

Figure 3:
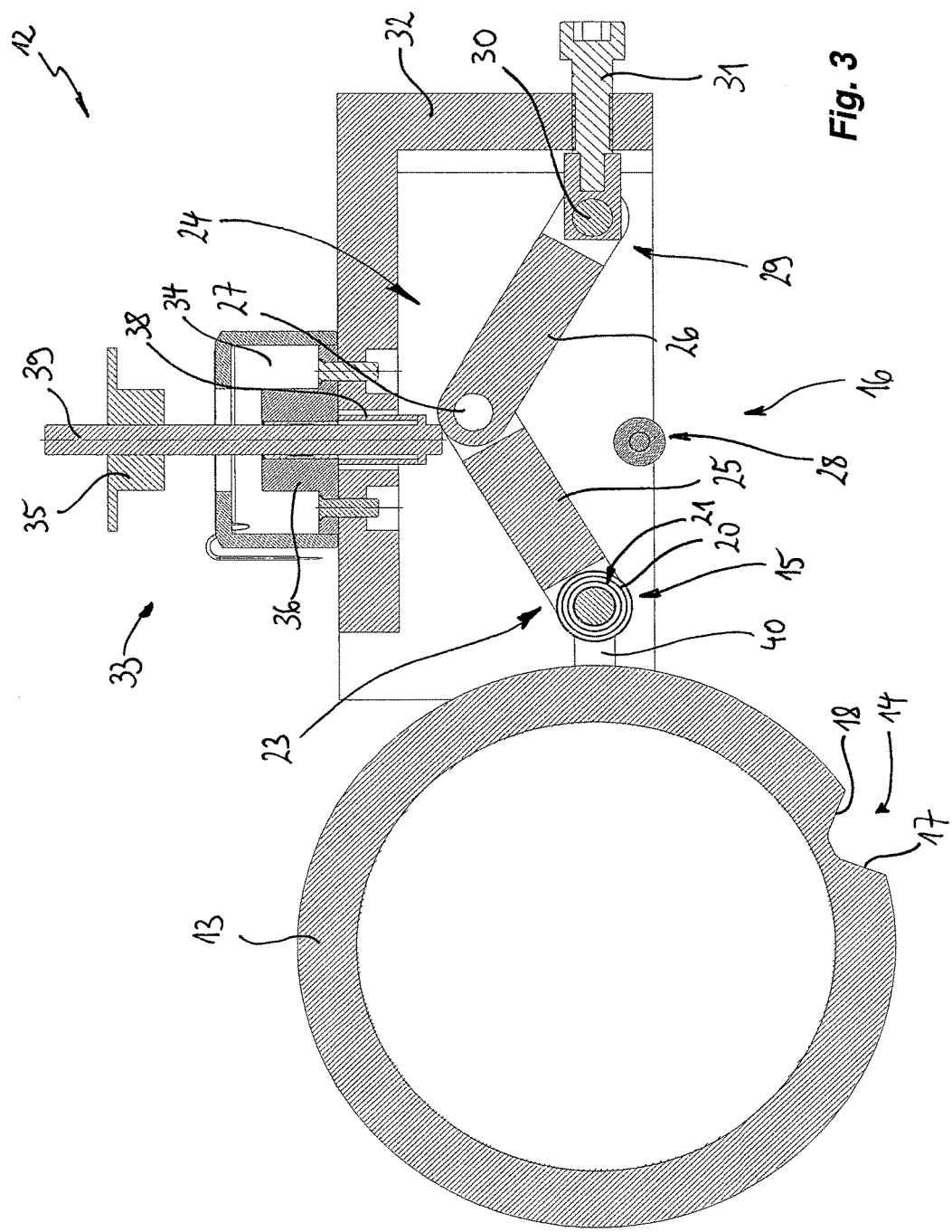
FIG. 3 shows the locking device of the fitting switching device as per FIG. 2 with the blocking element disengaged.

Here, the blocking element 15 can be moved by way of an actuating device 16 from the disengaged position shown in FIG. 3 into the engaging position shown in FIG. 2.

Here, the recess 14 is formed with an oblique surface 17 which forces the blocking element 15 into its engaging position.

Here, the oblique surface 17 is oriented such that a force arising from a torque which is introduced into the element 13 by the emergency drive 11, and which acts on the blocking element 15 into the engaging position thereof, has a component 45 by way of which the blocking element 15 is forced out of the recess 14 and would thus be disengaged if the actuating device 16 permits the disengagement.

On an opposite side of the recess 14 there is formed a further oblique surface 18 which acts similarly in the case of an opposite direction of rotation of the element 13.

The oblique surface 17 and the oblique surface 18 enclose between them an opening which, owing to the oblique orientation of the oblique surfaces 17, 18, widens toward the open end of the recess 14, that is to say in the direction of an increasing radius.

In relation to the axis of rotation 19 of the element 13, the oblique surfaces 17, 18 are in each case inclined, or oriented at an angle, with respect to a radial direction.

This has the effect that the component 45 of the action-imparting force is oriented radially with respect to the axis of rotation 19. Any prevailing or generated tangential force components are absorbed for example by corresponding bearing arrangements or support surfaces, and do not play a role in the further considerations.

To facilitate a disengagement of the blocking element 15, the blocking element 15 is in the form of an outer ring 20 of a ball bearing 21.

FIG. 4 shows that four ball bearings 21 are arranged adjacent to one another on a common journal 22 in order to provide a larger rolling surface. In further embodiments, it is possible for fewer or more such ball bearings 21, for example two, three, five or more than five ball bearings, to be arranged on the journal 22.

The blocking element 19 is formed and arranged on a free end 23 of a knee lever 24.

Here, the knee lever 24 has a first limb 25 and a second limb 26 which are articulatedly connected to one another by way of a joint 27.

For the adjustment of the blocking element 15, the actuating device 16 engages on the joint 27.

By way of the actuating device 16, the knee lever 24 is transferred from a flexed position as per FIG. 3 into a more straightened position as per FIG. 2. A stop element 28 is positioned such that a scenario in which the knee lever 24 reaches the fully straightened position or an over-straightened position is reliably avoided or prevented. Here, the stop element 28 is formed on the housing wall 32 or on some other static frame part, but in further exemplary embodiments may also be formed on the knee lever 24.

At that end 29 of the knee lever 24 which is averted from the free end 23, the knee lever 24 is articulated at an engagement point 30. The engagement point 30 is fixedly connected to a control element 31, in this case by way of example to a control screw. The control element 31 is connected to the housing part 32 such that the situation of the control element 31 relative to the housing part 32 is variable and adjustable. In the exemplary embodiment, the control screw is screwed into a threaded bore of the housing wall 32 or of some other static frame part.

The engagement point 30 is thus adjustable in terms of situation by adjustment of the control element 31. By way of said situation adjustment, the position of the blocking element 15 in the engaging position as per FIG. 2 can be coordinated with the actual situation of the recess 14.

The actuating device 16 has an electrically actuatable solenoid 33. The solenoid 33 has a coil 34, a drive part 35 in the form of an armature, and a core 36.

In a manner known per se, when the coil 34 is energized, the drive part 35 is attracted to the core 36 in order to close a magnetic circuit.

Here, an electronic circuit 37 ensures that a first coil current flows through the coil 34 for the attraction of the drive part 35, whereas a relatively lower, second coil current flows through the coil 34 in order to hold the drive part 35.

In the scenario shown in FIG. 3, the solenoid 33 will be able to generate a low force because the air gap between the drive part 35 and the core 36 is still relatively large.

To assist an actuating movement, the actuating device 16 additionally has a spring 38—in this case a helical spring—which assists the actuating movement when the solenoid 33 is energized.

The spring 38 thus does not serve for returning the knee lever 24 into the flexed position but rather likewise serves for transferring it into the slightly straightened position as per FIG. 2.

Here, the spring 38 is dimensioned so as to be in the relaxed state in the illustration as per FIG. 2.

Therefore, in FIG. 2, the spring 38 makes no contribution, or almost no contribution, to the pressing of the blocking element 15 into the recess 14.

Altogether, the spring force of the spring 38 is dimensioned such that the blocking element 15 can be disengaged from the recess 14 counter to the force generated by the spring 38 by the emergency drive 11.

In other words, the spring 38 has the characteristic whereby the force that it exerts on the knee lever 24 decreases in that movement direction in which the force generated by the solenoid 33 when the coil 34 is energized increases.

The actuating device 16 has a plunger element 39 which acts on the knee lever 24. The plunger element 39 acts on the blocking element 15 indirectly via the knee lever 24.

The plunger element 39 is screwed into the movable drive part 35. By way of the screwing action of the plunger element 39, it is thus possible for the position thereof relative to the drive part 35 to be varied. The plunger element 39 is thus adjustable in terms of situation on the drive part 35 in order to be able to adjust the engaging position of the blocking element 15 and the disengaged position thereof as per FIG. 3. The spring 38 is mounted onto the plunger element 39.

The blocking element 15 is guided by a guide means 40 of the housing wall 32 or of some other frame part. For this purpose, in the exemplary embodiment, the journal 22 which bears the blocking element 15 engages into a slot which forms the guide means 40.

On the housing wall 32 there is arranged a detection element 41 by way of which the attainment and presence of the engaging position of the blocking element 15 can be detected.

For this purpose, the detection element 41 has two limit switches 42 which operate in parallel. The limit switches 42 are actuated by the journal 22 or by some other part which is moved with the blocking element 15.

An output signal of the detection element 41 is used by the electronic circuit 37 already mentioned above to lower the coil current.

The actuating device 16 furthermore has a logic combination device 43.

The logic combination device 43 may be formed separately or may be formed so as to be integrated into the electronic circuit 37.

The logic combination device 43 combines an output signal of the detection element 41, for example the output signal already mentioned above, with a monitoring signal of the actuating device 16. This logical combination may for example be an AND combination. The monitoring signal of the actuating device 16 may for example be a signal relating to the energization of the actuating device or to some other activation of said actuating device 16.

The logically combined signal of the combination device 43 can be utilized for monitoring for fault-free operation of the actuating device 16. It is thus possible to identify states in which the locking state of the engaging position of the blocking element 15 has not been assumed despite the actuating device 16 being activated, or conversely, the blocking element 15 does not move into the disengaged position despite the actuating device 16 not being activated.

In the event of deviations detected in this way, a fault signal is generated and output in a manner known per se.

Figure 5:
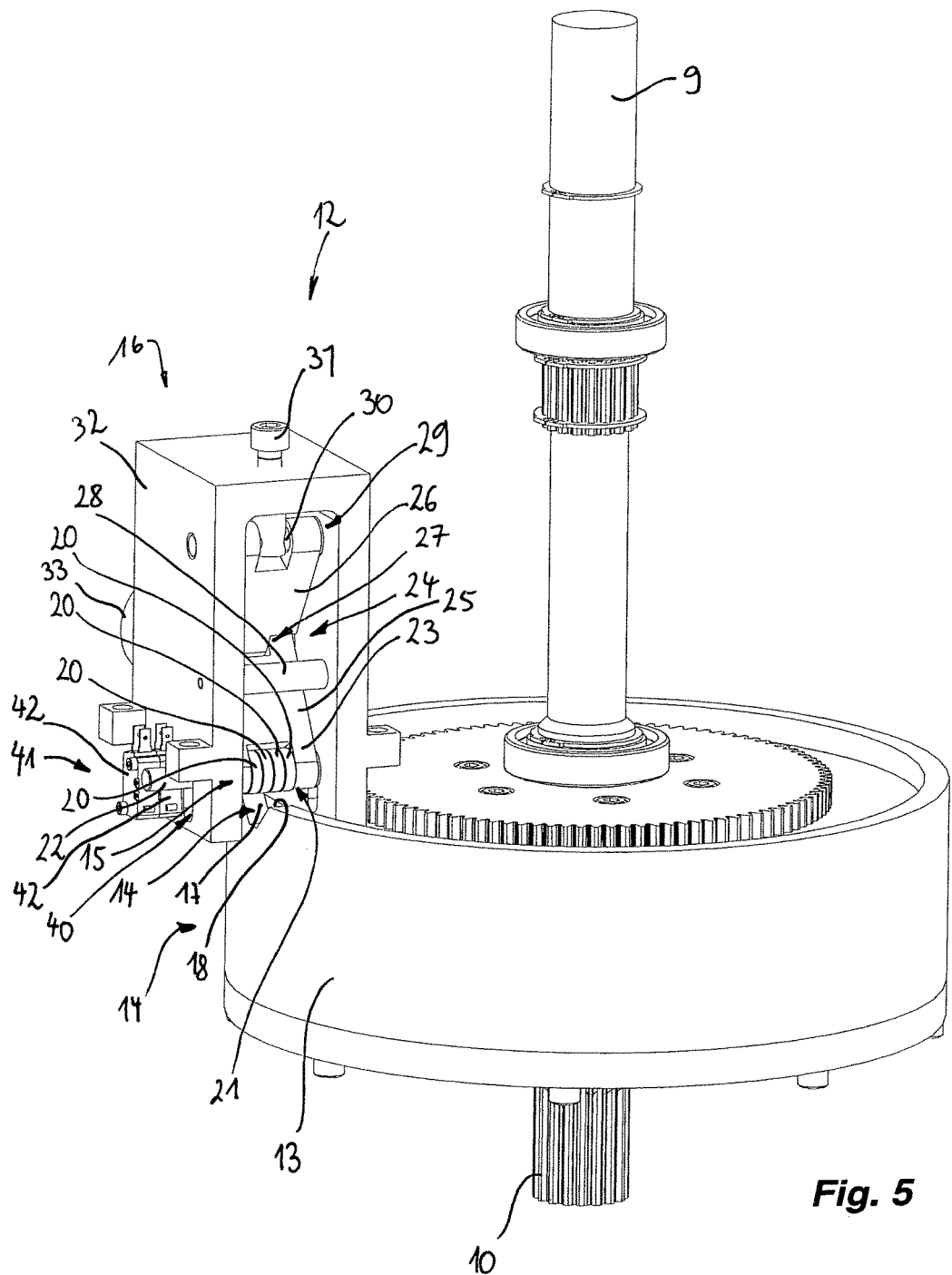
FIG. 5 shows, in a three-dimensional perspective view, a part of a further locking device according to the invention with the actuating device and with the driven element that provides the recess, wherein the blocking element has been disengaged from the recess.
Figure 6:
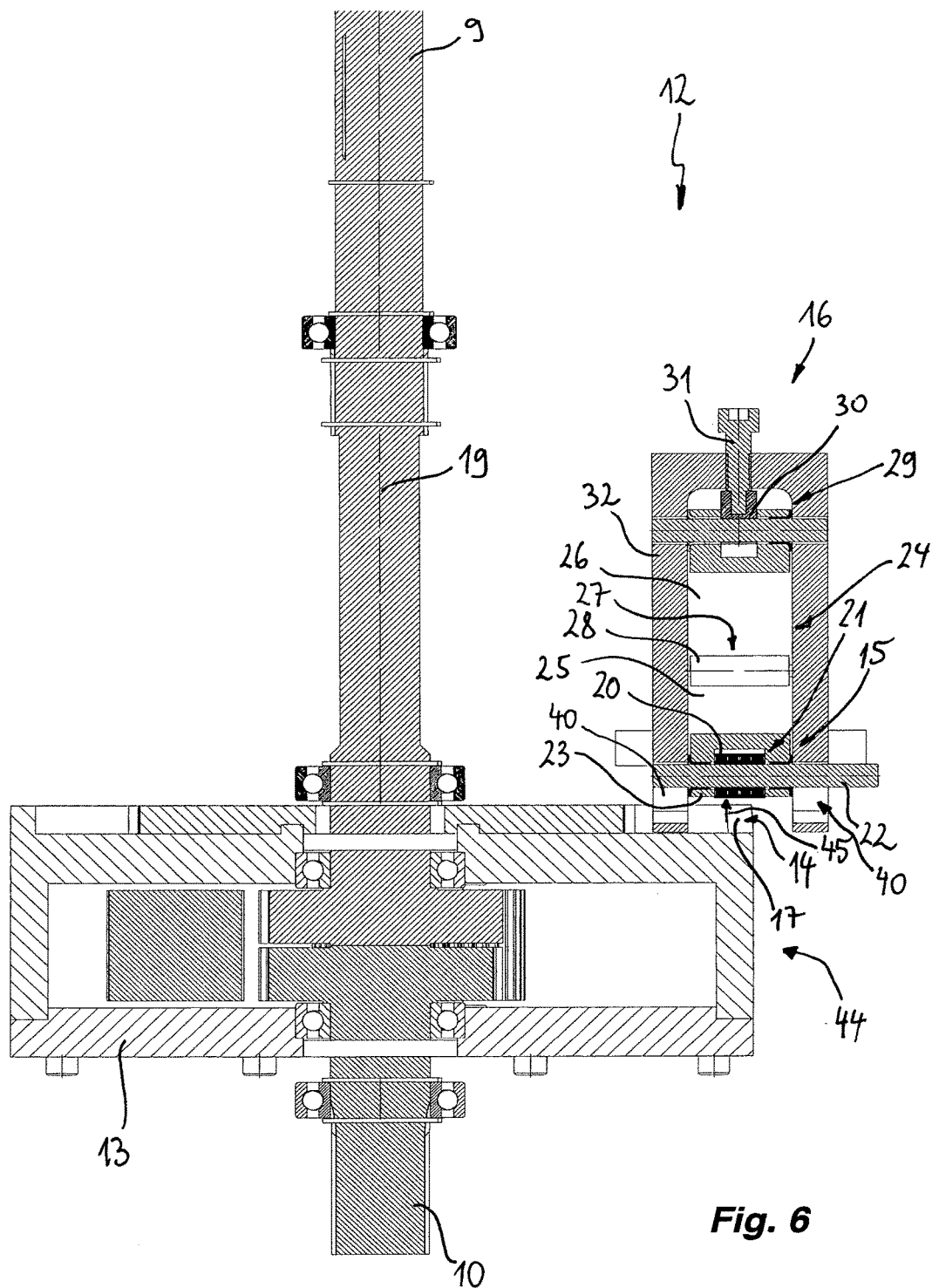
FIG. 6 shows the exemplary embodiment as per FIG. 5 in a sectional illustration.
Figure 7:
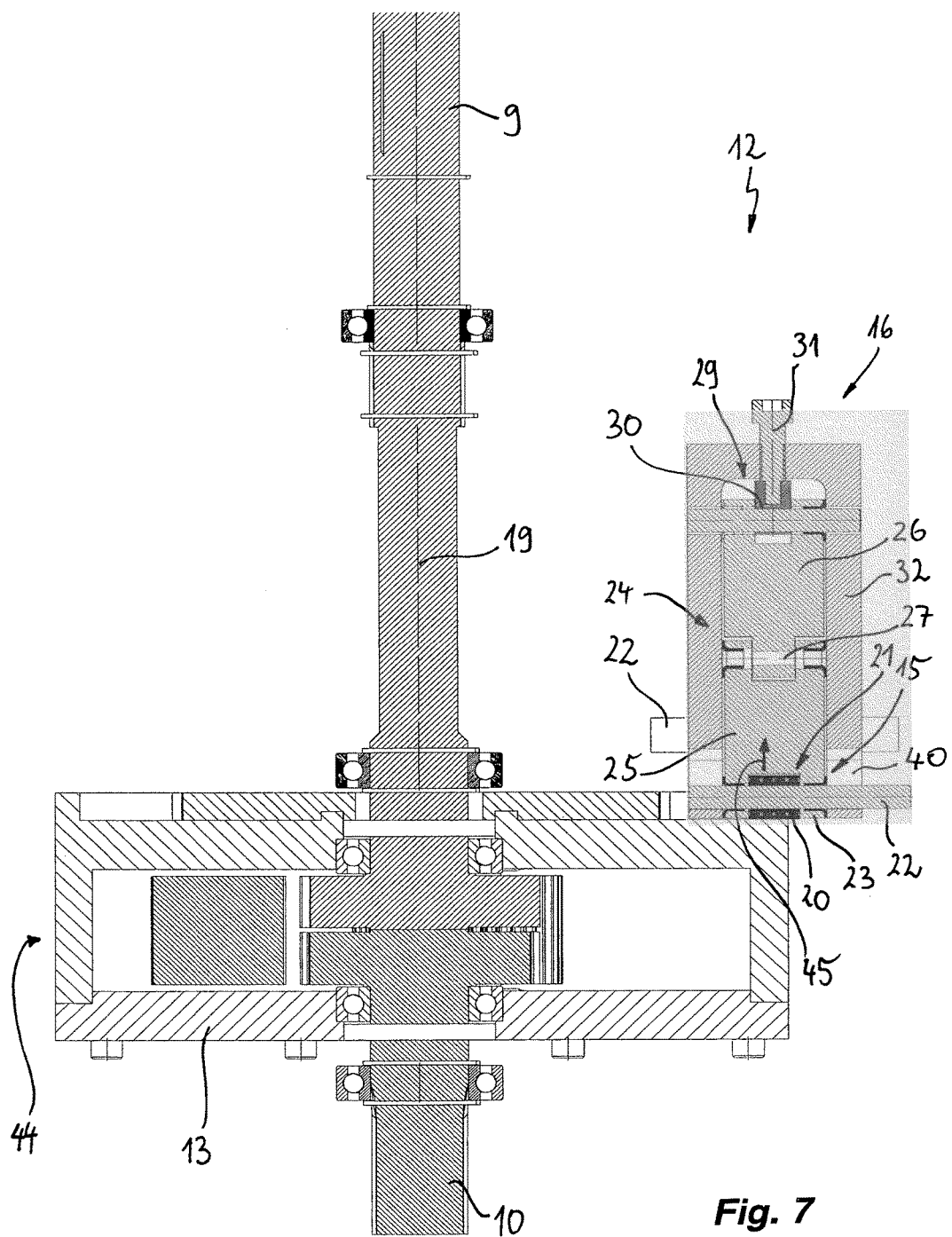
FIG. 7 shows the exemplary embodiment as per FIG. 5 in a sectional illustration, with the blocking element engaging into the recess.

FIG. 5 shows, in a likewise greatly simplified illustration, parts of a further fitting switching device 8 according to the invention, FIG. 6 is a sectional illustration relating to FIG. 5, and FIG. 7 shows the blocking element 15 in an engaged position in which it engages into the recess 14. Components and functional units which are similar or identical in terms of construction and/or function to the exemplary embodiment as per FIGS. 1 to 4 are denoted by the same reference designations and will not be described once again. The statements made with regard to FIGS. 1 to 4 therefore apply correspondingly to FIGS. 5 to 7.

The exemplary embodiment as per FIGS. 5 to 7 differs from the preceding exemplary embodiment at least by the fact that the recess 14 on the driven and/or drivable element 13 opens in an axial direction, that is to say in a direction parallel to the axis of rotation 19. The blocking element 15 correspondingly engages with an axially oriented movement into the recess 14 for locking purposes. Here, the element 13 is formed as part of a housing of the superposition gearing 44.

This has the result that the component 45 is oriented axially in relation to an axis of rotation 19 of the drivable and/or driven element 13, that is to say parallel to the axis of rotation 19.

The actuating device 16 is arranged in an axial section between the superposition gearing 16 (not shown in any more detail) and the emergency drive 11 (likewise not shown in any more detail). This permits an arrangement close to the axis of rotation 19, which can also be realized in the case of a radially disengageable blocking element 15.

In the case of the fitting switching device 8, it is proposed for a recess 14 of an element 13 which is driven by an emergency drive 11 to be formed with at least one oblique surface 17, 18, such that a blocking element 15 that engages into the recess 14 can be disengaged from the recess 14 by actuation of the emergency drive 11.

The invention claimed is:

1. A fitting switching device (8), comprising a drive-output shaft (10) and an input shaft (9) coupled to the drive-output shaft (10) and by way of which the drive-output shaft (10) is drivable in a normal operating mode, and having an emergency drive (11) that transfers the drive-output shaft (10) from a usage position into an end position, a recess (14) is formed on an element (13) which is at least one of drivable or driven by the emergency drive (11), and a blocking element (15) is movable by way of an actuating device (16) from a position in which said blocking element is disengaged from the recess (14) into a position in which said blocking element engages into the recess (14), the recess (14) has at least one oblique surface (17, 18) which acts on the blocking element (15), and the at least one oblique surface (17, 18) is oriented such that a force that is imparted to the blocking element (15) by the emergency drive (11) in the engaging position has a component (45) which causes the blocking element (15) to be disengaged from the recess (14), and the actuating device (16) has a solenoid (33) and a spring (38) that applies a force to assist a force generated by the solenoid (33) for an actuating movement of the actuating device (16).

2. The fitting switching device (8) as claimed in claim 1, wherein the oblique surface (17, 18) describes an opening which widens toward an open end of the recess (14).

3. The fitting switching device (8) as claimed in claim 1, wherein the element that is at least one of driveable or driven is a rotating element, or the component (45) is oriented radially or axially in relation to an axis of rotation (19) of the element that is at least one of driveable or driven, or both.

4. The fitting switching device (8) as claimed in claim 1, wherein the blocking element (15) is formed on a free end (23) of a knee lever (24), or the actuating device (16) engages on a movable joint (27) of the or a knee lever (24), or both.

5. The fitting switching device (8) as claimed in claim 1, further comprising an electronic circuit (37) for the actuation of the solenoid (33), said electronic circuit is designed for providing a first coil current for an attracting action of the solenoid (33) and for providing a relatively lower second coil current for a holding action of the solenoid (33).

6. The fitting switching device (8) as claimed in claim 1, wherein the spring (38) is relaxed when the blocking element (15) has been transferred into the engaging position, or a spring force of the spring (38) is dimensioned such that, when the actuating device (16) is inactive, the blocking element (15) is disengagable from the recess (14) counter to the spring force by way of the emergency drive (11), or both.

7. The fitting switching device as claimed in claim 1, wherein the actuating device (16) has a plunger element (39) which acts directly or indirectly on the blocking element (15) and which is fastened, adjustably in terms of situation, to a movable drive part (35) of the actuating device (16).

8. The fitting switching device (8) as claimed in claim 1, wherein a superposition gearing (44) is arranged in a power flow between the input shaft (9) and the drive-output shaft (10), and a second input of the superposition gearing (44) is coupled to the element that is at least one of drivable or driven (13).

9. A fitting control arrangement (1) having a control drive (2), wherein a drive output (4) of the control drive (2) is operatively connected to the input shaft (9) of a fitting switching device (8) as claimed in claim 1.

10. A fitting switching device (8), comprising a drive-output shaft (10) and an input shaft (9) coupled to the drive-output shaft (10) and by way of which the drive-output shaft (10) is drivable in a normal operating mode, and having an emergency drive (11) that transfers the drive-output shaft (10) from a usage position into an end position, a recess (14) is formed on an element (13) which is at least one of drivable or driven by the emergency drive (11), and a blocking element (15) is movable by way of an actuating device (16) from a position in which said blocking element is disengaged from the recess (14) into a position in which said blocking element engages into the recess (14), the recess (14) has at least one oblique surface (17, 18) which acts on the blocking element (15), and the at least one oblique surface (17, 18) is oriented such that a force that is imparted to the blocking element (15) by the emergency drive (11) in the engaging position has a component (45) which causes the blocking element (15) to be disengaged from the recess (14), and the actuating device (16) has a spring (38) which assists an actuating movement of the actuating device (16), and the blocking element (15) is formed on or by an outer ring (20) of a ball bearing (21).

11. A fitting switching device (8), comprising a drive-output shaft (10) and an input shaft (9) coupled to the drive-output shaft (10) and by way of which the drive-output shaft (10) is drivable in a normal operating mode, and having an emergency drive (11) that transfers the drive-output shaft (10) from a usage position into an end position, a recess (14) is formed on an element (13) which is at least one of drivable or driven by the emergency drive (11), and a blocking element (15) is movable by way of an actuating device (16) from a position in which said blocking element is disengaged from the recess (14) into a position in which said blocking element engages into the recess (14), the recess (14) has at least one oblique surface (17, 18) which acts on the blocking element (15), and the at least one oblique surface (17, 18) is oriented such that a force that is imparted to the blocking element (15) by the emergency drive (11) in the engaging position has a component (45) which causes the blocking element (15) to be disengaged from the recess (14), and the actuating device (16) has a spring (38) which assists an actuating movement of the actuating device (16), the blocking element (15) is formed on a free end (23) of a knee lever (24), and a stop element (28) is formed which prevents the knee lever (24) from being transferred into a straightened position.

12. A fitting switching device (8), comprising a drive-output shaft (10) and an input shaft (9) coupled to the drive-output shaft (10) and by way of which the drive-output shaft (10) is drivable in a normal operating mode, and having an emergency drive (11) that transfers the drive-output shaft (10) from a usage position into an end position, a recess (14) is formed on an element (13) which is at least one of drivable or driven by the emergency drive (11), and a blocking element (15) is movable by way of an actuating device (16) from a position in which said blocking element is disengaged from the recess (14) into a position in which said blocking element engages into the recess (14), the recess (14) has at least one oblique surface (17, 18) which acts on the blocking element (15), and the at least one oblique surface (17, 18) is oriented such that a force that is imparted to the blocking element (15) by the emergency drive (11) in the engaging position has a component (45) which causes the blocking element (15) to be disengaged from the recess (14), and the actuating device (16) has a spring (38) which assists an actuating movement of the actuating device (16), the blocking element (15) is formed on a free end (23) of a knee lever (24), and the knee lever (24) is articulated on an engagement point (30) which is adjustable in terms of situation, or the free end (23) of the knee lever (24) is guided in a housing part (32), or both.

13. A fitting switching device (8), comprising a drive-output shaft (10) and an input shaft (9) coupled to the drive-output shaft (10) and by way of which the drive-output shaft (10) is drivable in a normal operating mode, and having an emergency drive (11) that transfers the drive-output shaft (10) from a usage position into an end position, a recess (14) is formed on an element (13) which is at least one of drivable or driven by the emergency drive (11), and a blocking element (15) is movable by way of an actuating device (16) from a position in which said blocking element is disengaged from the recess (14) into a position in which said blocking element engages into the recess (14), the recess (14) has at least one oblique surface (17, 18) which acts on the blocking element (15), and the at least one oblique surface (17, 18) is oriented such that a force that is imparted to the blocking element (15) by the emergency drive (11) in the engaging position has a component (45) which causes the blocking element (15) to be disengaged from the recess (14), and the actuating device (16) has a spring (38) which assists an actuating movement of the actuating device (16), and a detection element (41) that detects at least one of an attainment or presence of the engaging position.

14. The fitting switching device (8) as claimed in claim 13, wherein a combination device (43) is provided which is designed for logically combining an output signal of the detection element (42) with a monitoring signal of the actuating device (16).

* * * * *